Aug. 4, 1936. J. BAILEY 2,050,205
MEANS FOR AND METHOD OF PREVENTING ISSUANCE OF REFRACTORY
CONTAMINATED GLASS FROM FEEDER OUTLETS
Filed June 15, 1934

Witness:
A. A. Horn

Inventor:
James Bailey
by Brown & Carham
Attorneys.

Patented Aug. 4, 1936

2,050,205

UNITED STATES PATENT OFFICE 2,050,205

MEANS FOR AND METHOD OF PREVENTING ISSUANCE OF REFRACTORY-CONTAMINATED GLASS FROM FEEDER OUTLETS

James Bailey, Hamburg, N. Y., assignor to Hartford-Empire Company, Hartford, Conn., a corporation of Delaware Application June 15, 1934, Serial No. 730,748

16 Claims. (Cl. 49—55)

Articles of hollow glassware which have been formed from mold charges obtained from glass that has issued from a submerged discharge outlet of a feeder may have defects, particularly at the surface thereof, which are attributable to the presence of refractory-contaminated glass in the charges from which the articles were formed.

Molten glass passing along refractory walls of a feeder to a submerged outlet of the feeder tends to become chilled and otherwise contaminated by reason of contact with the refractory walls. This contaminated glass, being heavier than the uncontaminated glass of the supply body in a feeder forehearth or container, will approach the submerged outlet at the bottom of the feeding container and, on entering the outlet will be included in a surface portion of the column of glass issuing from the outlet. When charges are severed from the column of glass that has issued from the outlet, the contaminated glass which has never completely coalesced with the remaining glass of the charge will be included in surface portions of the charges and will cause defects in the surface portions of the article into which the charges subsequently are formed.

Even when the outlet extends above the bottom of the feeding container, refractory-contaminated glass may still be drawn into the outlet with the hotter glass from a higher level for the reason that contaminated glass tends to accumulate around such an outlet.

An object of the present invention is to provide a simple, reliable and efficient means and a novel method of preventing refractory-contaminated glass from entering a submerged discharge outlet of a glass feeding container without interfering with the egress from the container through the outlet of uncontaminated glass.

A further object of the invention is to provide an efficient means for separating refractory-contaminated glass from uncontaminated glass at the upper or intake end of a submerged discharge outlet of a feeder and for removing the contaminated glass from the glass feeding container so as to prevent such contaminated glass from again mingling with the uncontaminated glass therein.

Other objects and advantages of the invention will become apparent from the following description of a glass feeding container equipped with a structural embodiment of the invention and adapted for the performance of the method of the invention, as shown in the accompanying drawing, in which.

Figure 1:
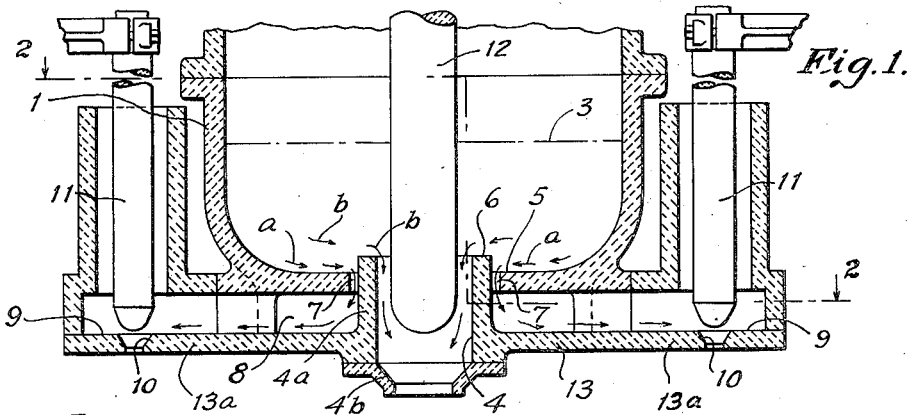
Figure 1 is a transverse vertical section through the outer or delivery end portion of a glass feeding forehearth or container having a submerged discharge outlet and being provided with mechanism for excluding refractory-contaminated glass from the outlet and for draining off such contaminated glass so as to prevent it from mixing subsequently with the glass in the feeding container.
Figure 2:
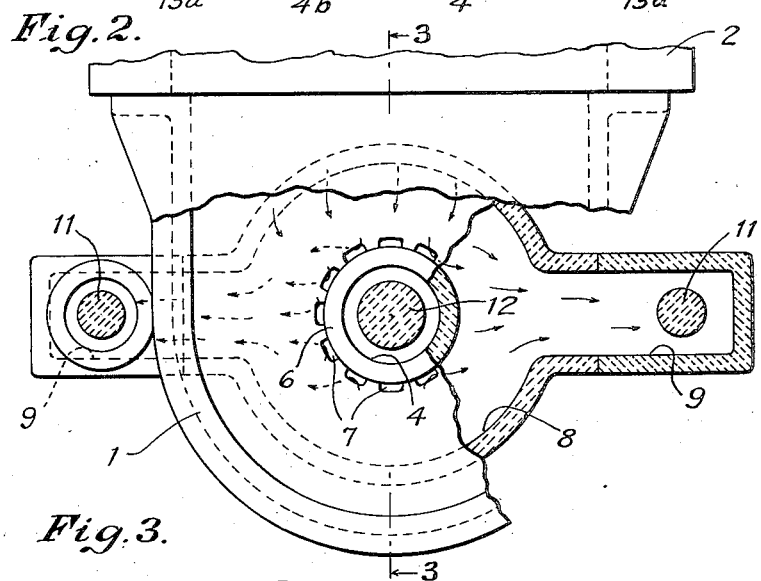
Fig. 2 is a horizontal sectional view substantially along the line 2—2 of Fig 1.
Figure 3:
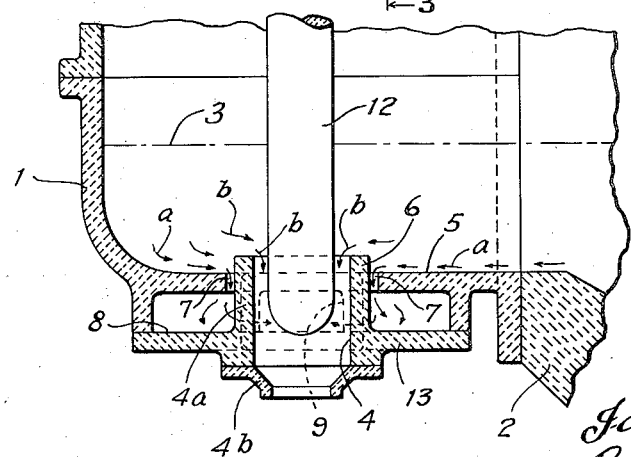
Fig. 3 is a longitudinal vertical sectional view substantially along the line 3—3 of Fig 2.

In the drawing, the numeral 1 designates a glass feeding bowl, spout, or container, such, for example, as the outer end portion of the glass flow channel of a furnace extension or forehearth, a fragmentary portion of which is indicated at 2 in Figs 2 and 3. It will be understood that such a glass flow channel may be connected with a glass melting tank or furnace (not shown) or other suitable source of supply of molten glass so that the glass feeding container 1 will receive glass from the source of supply at a rate sufficient to maintain a substantial body of glass in such container, as to the level indicated at 3 in Figs. 1 and 3.

The glass feeding container is provided with a discharge outlet 4 in its base, which outlet is submerged by the glass in the feeding container.

In carrying out the present invention, the walls of the outlet 4 extend above the bottom 5 of the glass feeding container so as to produce a cylindrical curb or baffle 6 at the juncture of the outlet with the feeding container. Surrounding this curb or projecting upper end portion of the outlet structure are a series of drainage ports 7. The ports 7 establish communication between the interior of the feeding container 1 and a drainage chamber 8 which may surround a portion of the walls of the outlet structure 4.

The drainage chamber 8 may have one or more lateral extensions, such as indicated at 9, Figs. 1 and 2. Outlets, such as indicated at 10, may be formed in the bottoms of these extensions. Each of such outlets may be controlled in any suitable known manner as by an adjustable plug or valve, such as indicated by the refractory implement 11.

The operation of the structure that has been described so far will be readily understood. Part of the glass from the source of supply will sweep along refractory walls of the glass feeding container, as along paths such as those indicated by the arrows *a* in Figs. 1 and 3. This glass will be chilled by reason of its contact with or proximity to the refractory walls of the feeding container and may be further contaminated by reason of such contact. Being heavier than uncontaminated glass, such contaminated glass will seek the bottom of the feeding container as it moves toward the feeder outlet. The curb or baffle which constitutes the upper end portion of the outlet structure will tend to prevent the contaminated glass from passing into the outlet. As such contaminated glass strikes the baffle, it will be drawn downwardly through the drainage ports 7 into the drainage chamber 8, as indicated by arrows in the several views of the drawing.

As indicated by arrows in Figs. 1 and 2, the contaminated glass may pass outwardly in the drainage chamber 8 to the drainage chamber outlets 10. Any suitable means, such as a cullet chute (not shown), may be provided in association with each drainage outlet 10 for disposing of the contaminated glass after it has left the outlet. The amount of glass drawn from the feeding container through the drainage chamber may be regulated by adjustment of the members 11 by which the outlets 10 are controlled.

Uncontaminated glass passing to the upper end of the outlet 4 will of course be free to enter that outlet and to pass downwardly through the outlet. The arrows designated *b* in Figs. 1 and 3 indicate flow of uncontaminated glass from the feeding container into the upper end of the outlet and downwardly in such outlet.

The discharge of uncontaminated glass from the feeding container through the outlet 4 may be under the control of any suitable glass discharge regulating mechanism such, for example, as that which includes a reciprocating plunger 12. It of course will be understood that the glass issuing from the outlet 4 may be separated into mold charges by the periodic operation of suitable severing mechanism (not shown).

Only the bare refractory parts of the glass feeding container as equipped with the invention have been shown. It of course is to be understood that in the practice of the invention, the glass feeding container and the associate structural features of the invention as herein described may be constructed in any suitable known manner, may be suitably insulated, and may be supported and held in place in any suitable known manner. Provision may be made in any suitable known manner for controlling the temperature and condition of the glass in the feeding container and issuing from the outlet and also for preventing undesirable chilling or lowering of temperature of the contaminated glass that is being drained off.

In the particular embodiment of the invention shown in the drawing, the outlet structure comprises a refractory cylindrical member 4*a* that has been formed separately from the refractory walls of the feeding container 1. This refractory outlet member 4*a* is shown as projecting through an opening in the bottom of the feeding container so that its upper end portion constitutes the aforesaid curve or circular baffle 6. The drainage ports 7 have been provided by forming notches in the wall of the opening through which the cylindrical outlet member extends. An orifice ring 4*b* is disposed against the lower end of the cylindrical member 4*a* and may be held releasably in place in any suitable known manner.

The lower end portion of the cylindrical outlet member 4*a* is shown as having a disk-like enlargement or integral flange 13 which forms the bottom of the drainage chamber, being provided with lateral extensions 13*a* which constitute the bottoms of the lateral extensions 9 of the drainage chamber. The outlet ports 10 for the drainage chamber are shown as having been formed in the lateral extensions 13*a* of the flange 13. A portion of the bottom of the feeding container 1 forms part of the top of the drainage chamber 8, the remainder of the top and the side walls of such drainage chamber comprising suitably shaped refractory members which may be held in place in any suitable known manner.

The particular construction shown is merely one example of many which might be provided without departing from the spirit and scope of the invention. The invention therefore is not to be limited to the particular structural details shown, or beyond the terms of the appended claims.

I claim:

1. In combination, a container for molten glass having a discharge outlet through which glass from the container tends to issue by gravity, and means for removing from the bottom of the container glass that has been contaminated by contact with walls of the container before such contaminated glass can issue from said outlet.

2. The combination with a glass feeding container having a discharge outlet submerged by a supply body of molten glass in the container, means for preventing glass of said supply body that has been contaminated by contact with a wall of said container from passing horizontally along the bottom of the container into said outlet, and means for separating such contaminated glass from the glass entering said outlet.

3. The combination with a refractory glass feeding container having an outlet submerged by a supply body of glass in the container, of means for intercepting glass of the supply body in its movement along the bottom of said refractory container toward said outlet, and means for draining off from the glass of the supply body the glass thus intercepted.

4. The combination with a refractory glass feeding container having a submerged outlet through which glass of the supply body tends to issue by gravity, means located adjacent to the inlet end of said outlet for preventing glass that has been contaminated by contact with a wall of said container from moving along the bottom of the container horizontally into said outlet, and means communicating with said container adjacent to said outlet for draining off said contaminated glass.

5. The combination with a refractory glass feeding container having a discharge outlet submerged by a supply body of molten glass in the container, said outlet projecting above the bottom of said container and having its upper end located below the surface of said supply body of glass, and means located adjacent to the juncture of said outlet with the bottom of said container for conducting from the bottom of the container glass that has been contaminated by contact with a wall of said container before such contaminated glass can pass into the upper end of said outlet.

6. The combination with a refractory glass feeding container having an outlet submerged by the glass therein, and a drainage chamber communicating with the interior of said feeding container adjacent to the juncture of said outlet with said feeding container for draining from the feeding container relatively heavy glass that has been contaminated by contact with a wall of the container and is moving along the bottom of the container toward said outlet.

7. The combination with a refractory glass feeding container having a discharge outlet in its base submerged by a supply body of glass in the container, of a drainage chamber located below the level of said glass feeding container and communicating with the interior of said glass feeding container through ports in the bottom thereof, said ports being located at points spaced around and adjacent to said outlet.

8. The combination with a refractory glass feeding container having a discharge outlet in its base submerged by a supply body of glass in the container, a drainage chamber located below the level of said glass feeding container and communicating with the interior of said glass feeding container at points spaced around and adjacent to said outlet, said drainage chamber having an outlet, and means for controlling the flow of glass from the outlet of said drainage chamber to regulate the drainage of glass from said feeding container into said drainage chamber.

9. The combination with a glass feeding container adapted to receive glass from a source of supply and having a discharge outlet submerged by the glass in the feeding container, a curb at the upper end of said outlet for preventing glass from passing horizontally along the bottom of the feeding container into the upper end of said outlet, and means at the outer side of said curb for draining from the feeding container glass that has passed along the bottom of the feeding container to the vicinity of said curb.

10. The combination with a refractory container having an outlet submerged by the glass in the container, said outlet extending above the level of the bottom of the container, a drainage chamber surrounding said outlet below the level of said feeding container, and means comprising a plurality of drainage ports spaced around and adjacent to said outlet for conducting to said drainage chamber refractory-contaminated glass in transit along the bottom of the feeding container toward said outlet.

11. The method of preventing issuance of refractory-contaminated glass from the outlet of a refractory glass feeding container having a discharge outlet below the level of the glass therein, comprising the steps of draining from the feeding container glass passing along the bottom of the container toward the outlet, and discharging through the outlet glass taken only from a level located substantially above that of the bottom of the feeding container.

12. The method of feeding molten glass from a refractory feeding container having an outlet submerged by the glass in the feeding container, comprising the steps of intercepting at the intake end of the outlet glass that has passed along the bottom of the container to the outlet, and removing from the feeding container such intercepted glass before it can mingle with glass entering said outlet.

13. The method of preventing issuance from a submerged discharge outlet of a refractory glass container of glass that has been contaminated by contact with a refractory wall of the container, comprising the steps of preventing horizontal movement of glass along the bottom of the feeding container into the outlet, draining glass from the bottom of the container around the outlet, and feeding glass from the container through the outlet entirely from a level above that from which glass is drained from the container.

14. The method of preventing issuance of refractory-contaminated glass from the submerged outlet of a refractory container, comprising the steps of intercepting horizontal flow of glass along the bottom into said outlet, draining from the container at a plurality of points around said outlet glass thus prevented from entering said outlet, and discharging from the outlet only glass from a higher level.

15. The method of preventing issuance from a submerged outlet of a refractory glass feeding container of glass that has been contaminated by contact with a wall of the container, comprising the steps of preventing horizontal flow into the outlet of a bottom layer of glass surrounding the outlet and of substantial thickness, and removing glass of said bottom layer from the container at a place other than said outlet.

16. The method of obviating refractory-contaminated glass from glass fed from the submerged outlet of a refractory glass feeding container, which comprises removing from the container a layer of glass of substantial thickness at the bottom of the container before glass of such layer can enter said outlet.

JAMES BAILEY.